United States Patent
Simonetti et al.

(10) Patent No.: US 11,788,428 B2
(45) Date of Patent: Oct. 17, 2023

(54) INTEGRATED HYBRID PROPULSION SYSTEM

(71) Applicant: Lockheed Martin Corporation, Bethesda, MD (US)

(72) Inventors: Joseph Lawrence Simonetti, Southbury, CT (US); Mark P. Eisenhauer, Milford, CT (US); Michael Strauss, New Haven, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 17/154,515

(22) Filed: Jan. 21, 2021

(65) Prior Publication Data
US 2022/0228505 A1    Jul. 21, 2022

(51) Int. Cl.
| | | |
|---|---|---|
| F01D 15/10 | (2006.01) | |
| H02K 7/18 | (2006.01) | |
| F02K 3/06 | (2006.01) | |
| F02C 7/36 | (2006.01) | |

(52) U.S. Cl.
CPC .......... *F01D 15/10* (2013.01); *H02K 7/1823* (2013.01); *F02C 7/36* (2013.01); *F02K 3/06* (2013.01); *F05D 2220/36* (2013.01); *F05D 2260/404* (2013.01)

(58) Field of Classification Search
CPC . F01D 15/10; H02K 7/1823; F05D 2260/404; F05D 2220/36; F02C 7/36; F02K 3/06
See application file for complete search history.

(56) References Cited

U.S. PATENT DOCUMENTS

| | | | |
|---|---|---|---|
| 4,309,621 A | 1/1982 | Litz | |
| 6,729,140 B2 | 5/2004 | Care et al. | |
| 7,603,864 B2 | 10/2009 | Gemin et al. | |
| 7,973,421 B2 | 7/2011 | Sharp | |
| 8,146,369 B2 | 4/2012 | Walitzki et al. | |
| 9,494,044 B1 | 11/2016 | Kloesel | |
| 9,714,609 B2 | 7/2017 | French et al. | |
| 2016/0319845 A1* | 11/2016 | Molnar | F04D 29/324 |
| 2019/0319514 A1 | 10/2019 | Williams et al. | |
| 2020/0224547 A1* | 7/2020 | Chong | H02K 1/276 |

FOREIGN PATENT DOCUMENTS

WO    WO-2015006445 A1 *    1/2015 ............. B64D 29/00

* cited by examiner

*Primary Examiner* — Joseph Ortega
(74) *Attorney, Agent, or Firm* — Foley & Lardner LLP

(57) ABSTRACT

A hybrid propulsion system extracts electrical power using a combined heat engine and electrical generator. The propulsion system includes a gas generator, an electrical power generator disposed upstream of the gas generator and configured to be driven by a power turbine, an output power shaft mated to the power turbine and extending through a central axis of the gas generator and power generator unit, an engine enclosure circumferentially surrounding the power generator, and a shroud disposed between the power generator and the engine enclosure. The electrical power generator includes at least one rotating member and a stationary conductive member. The at least one rotating member includes a magnetic portion, and rotation of the at least one rotating member relative to stationary conductive member generates a current transmissible by one or more coupled power output cables.

18 Claims, 7 Drawing Sheets

INTEGRATED HYBRID PROPULSION SYSTEM

FIELD

The present disclosure relates generally to the field of hybrid propulsion systems. More specifically, the present disclosure relates to an integrated hybrid propulsion system having a combination heat engine and electrical generator.

BACKGROUND

Various hybrid propulsion systems may implement a separate heat engine and generator to convert mechanical power to electrical power. Implementation of such separate elements often results in overall increased weight of the hybrid propulsion system.

SUMMARY

The present disclosure sets forth exemplary embodiments which provide an improved hybrid propulsion system that implements a combined heat engine and electrical generator to efficiently extract electrical power without undue increase in overall system weight or volume.

One embodiment of the disclosure relates to a propulsion system that includes a gas generator, an electrical power generator disposed upstream of the gas generator and configured to be driven by a power turbine, an output power shaft mated to the power turbine and extending through a central axis of the gas generator and the power generator unit, an engine enclosure, and a shroud disposed between the power generator and the engine enclosure. The engine enclosure is configured to circumferentially surround the power generator. The shroud may comprise one or more non-magnetic materials. The power generator may include one or more rotating members configured to rotate about an axis defined by the output power shaft, wherein the one or more rotating members includes a compressor stage or a radial flux rotor, and wherein each of the one or more rotating members includes a magnetic portion. The power generator may further include a plurality of conductive members, wherein at least one of the plurality of conductive members is a stationary conductive member, and wherein the stationary conductive member includes a plurality of conductive coils such that rotation of the one or more rotating members relative to the stationary conductive member generates a current that is transmissible by one or more coupled power output cables.

In various embodiments, the one or more rotating members are boost compressor stages. In some embodiments, each of the one or more boost compressor stages is driven by the output power shaft, which is mated to the power turbine located at a downstream end of the gas generator.

In various embodiments, each of the one or more boost compressor stages comprises a plurality of blades, the magnetic portion is formed by at least a subset of the plurality of blades, and each of the subset of the plurality of blades is made of one or more magnetic alloys.

In various embodiments, each of the one or more boost compressor stages comprises a plurality of blades, the magnetic portion is formed by at least a subset of the plurality of blades, and each of the subset of the plurality of blades includes a permanent magnet embedded within a tip portion of each blade such that only the subset of the plurality of blades is magnetized.

In various embodiments, the stationary conductive member is integrally formed within the engine enclosure. In some embodiments, the one or more rotating members comprise axial flux rotors. In various embodiments, the power generator further comprises at least one axial flux stator disposed adjacent at least one of the one or more axial flux rotors, wherein the at least one axial flux stator is coupled to the engine enclosure. In some embodiments, the stationary conductive member includes one or more coupled conductive coils.

In another embodiment of the present disclosure, a propulsion system includes a gas generator, an electrical power generator disposed upstream of the gas generator and configured to be driven by a power turbine, an output power shaft mated to the power turbine and extending through a central axis of the gas generator and the boost compressor, and an engine enclosure. The engine enclosure is configured to circumferentially surround at least the power generator, and includes a conductive portion comprising a plurality of coils. The power generator includes one or more compressor stages configured to rotate about an axis defined by the output power shaft, wherein each of the compressor stages includes a plurality of blades, a magnetic portion, and a non-magnetic portion, and wherein rotation of the one or more compressor stages relative to the engine enclosure generates a current transmissible by one or more power output cables coupled to the engine enclosure.

In various embodiments, the magnetic portion is formed by at least a subset of the plurality of blades, and wherein each of the subset of the plurality of blades is made of one or more magnetic alloys. In other embodiments, the magnetic portion is formed by at least a subset of the plurality of blades, and wherein each of the subset of the plurality of blades includes a permanent magnet embedded within a tip portion of each blade.

In various embodiments, the conductive portion is mounted to an inner surface of the engine enclosure. In some embodiments, the engine enclosure comprises a non-magnetic section, wherein the non-magnetic section surrounds the power generator. In various embodiments, the non-magnetic section of the engine enclosure is a composite.

In yet another embodiment of the present disclosure, a propulsion system includes a gas generator, an electrical power generator disposed upstream of the gas generator and configured to be driven by a power turbine, an output power shaft mated to the power turbine and extending through a central axis of the gas generator and the power generator, and an engine enclosure. The engine enclosure is configured to circumferentially surround the power generator. The power generator includes one or more axial flux rotors mated to the output power shaft and configured to rotate with the output power shaft about an axis defined by the output power shaft, wherein each of the axial flux rotors includes a magnetic portion and a non-magnetic portion, wherein the magnetic portion of each of the axial flux rotors generates a current within a stationary conductor portion when each of the axial flux rotors rotates about the axis relative to the engine enclosure, wherein a speed of rotation of the one or more axial flux rotors is regulated by a load requirement, and wherein a load requirement voltage varies within a predetermined range.

In various embodiments, the stationary conductor portion comprises at least one axial flux stator disposed adjacent at least one of the one or more axial flux rotors, wherein the at least one axial flux stator is coupled to the engine enclosure. In some embodiments, the engine enclosure transmits the current generated within the stationary conductor portion via one or more coupled output cables.

In various embodiments, the system further includes a variable load coupled to the power generator, wherein the variable load is configured to fulfill a minimum load requirement. In some embodiments, the magnetic portion comprises a plurality of circumferentially arranged permanent magnets.

BRIEF DESCRIPTION OF THE DRAWINGS

A clear conception of the advantages and features constituting the present disclosure, and of the construction and operation of typical mechanisms provided with the present disclosure, will become more readily apparent by referring to the exemplary, and non-limiting, embodiments illustrated in the drawings accompanying and forming a part of this specification, wherein like reference numerals designate the same elements in the several views, and in which.

Figure 1:
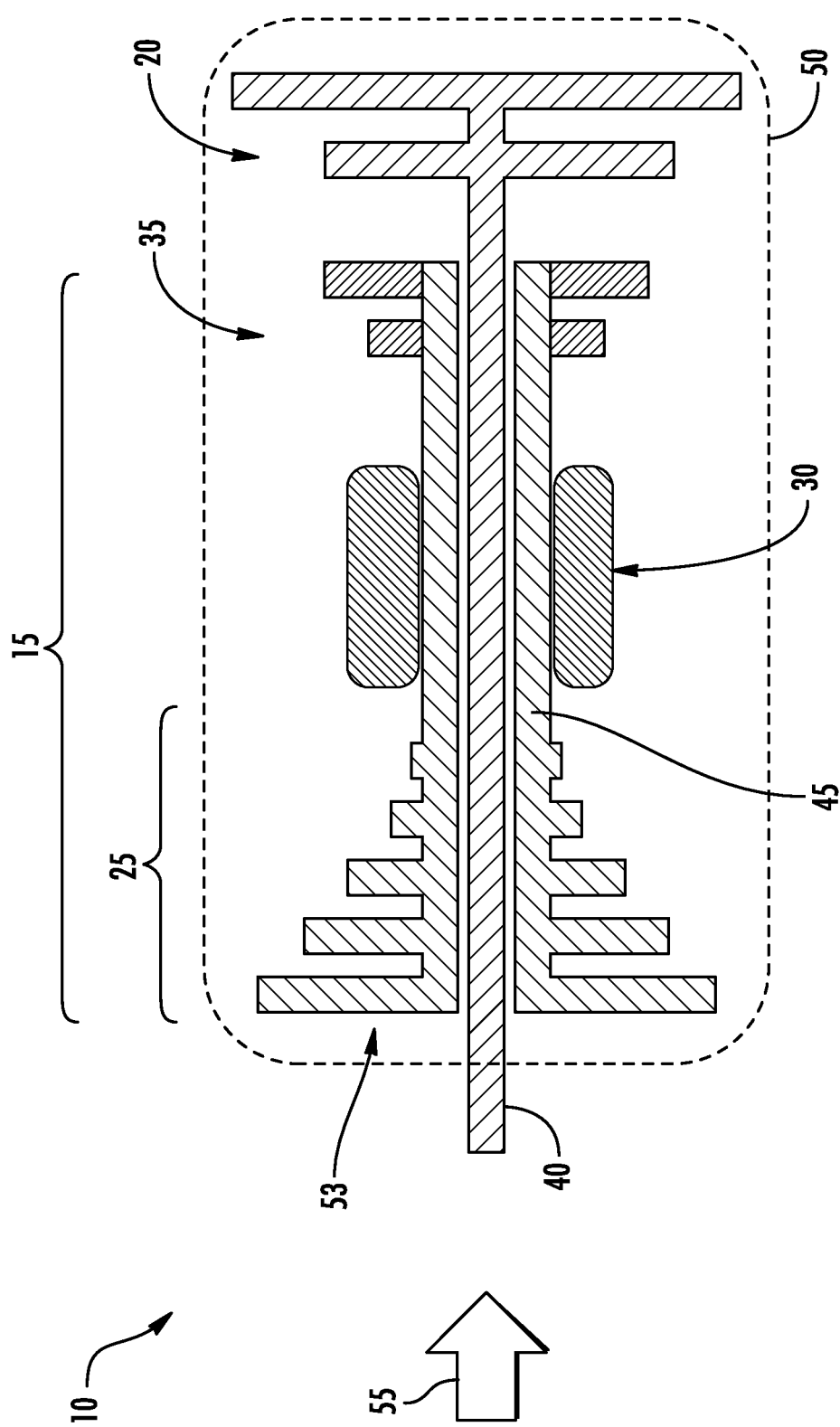
FIG. 1 is schematic representation of a side cross-sectional view of a propulsion system.

The foregoing and other features of the present disclosure will become apparent from the following description and appended claims, taken in conjunction with the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Referring to FIG. 1, a schematic representation of a side cross-sectional view of a propulsion system 10 is shown. The propulsion system 10 is a turboshaft engine configured to produce shaft power and includes a gas generator or gas generator section 15 and a power turbine 20. As illustrated, the gas generator section 15 includes a compressor section 25, a combustion section 30, and a high-pressure turbine 35. An output power shaft 40, which is driven by the power turbine 20, is disposed concentrically within a high-pressure turbine shaft 45 that couples the compressor section 25 and the high-pressure turbine 35. The output power shaft 40 and the high-pressure turbine shaft 45 pass through the combustion section 30, which is disposed between the compressor section 25 and the high-pressure turbine 35. The gas generator section 15 and its components, along with the power turbine 20, is contained within an enclosure 50.

The compressor section 25 includes a multi-stage compressor 53 (e.g., a compressor having N stages), which is configured to compress air flowing into the propulsion system 10 in an airflow direction 55. The multi-stage compressor 53 may include high-pressure axial and/or centrifugal stages. Air compressed within the compressor 53 flows through the combustion section 30 where the air is mixed with fuel (e.g., injected atomized fuel, gaseous fuel, natural gas, etc.) and ignited. The ignited mixture then flows into and through the high-pressure turbine 35 and the power turbine 20 to cause rotation thereof. The high-pressure turbine 35 may be a multi-stage (e.g., a high-pressure turbine having N-stage) axial-flow type or radial type turbine.

Rotation of the high-pressure turbine 35 and the power turbine 20 generate shaft power to then drive the high-pressure turbine shaft 45 and the output power shaft 40. The power turbine 20, which is also a multi-stage axial flow type turbine, may be mechanically separated from the compressor section 25. For example, the power turbine 20 extracts energy (i.e., work) from cycling within the gas generator section 15 (e.g., from the combusted air/fuel mixture) but may not otherwise affect operation or performance of the components within the gas generator section 15, including the compressor section 25. The compressor section 25 is driven by the high-pressure turbine shaft 45. As previously described, the power turbine 20 drives the output power shaft 40, which is concentrically disposed within the high-pressure turbine shaft 45 and extracts energy (i.e., work) therein.

Figure 2:
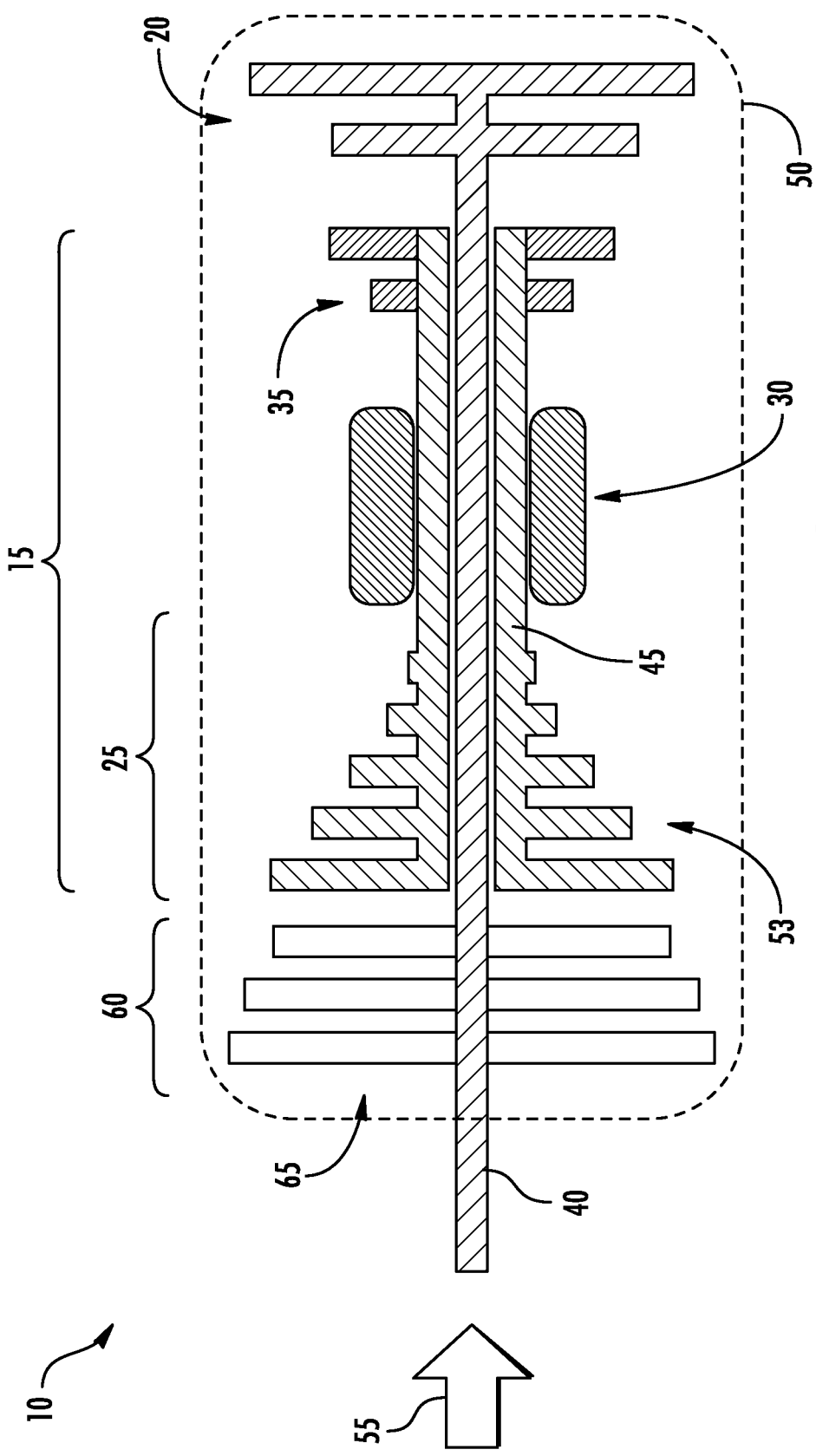
FIG. 2 is a schematic representation of a side cross-sectional view of a boosted propulsion system.

FIG. 2 shows propulsion system 10 further including a low-pressure compressor ("boost") section 60 having a plurality of low-pressure compressor stages 65 therein. As illustrated, the boost section 60 is disposed upstream of the gas generator section 15 and is configured to increase power of the propulsion system 10. The low-pressure compressor or boost stages 65 may be axial-flow compressor stages (e.g., similar to the compressor stages of multi-stage compressor 53). The boost stages 65 are driven by the output power shaft 40, which is mated to and driven by the power turbine 20.

During operation of propulsion system 10, with or without boost stages 65, a separate electrical power generator may be coupled downstream of the power turbine 20. The electrical power generator may be configured to generate electricity to power traction motors and/or auxiliary components within and/or coupled to the propulsion system 10. With such an arrangement, the propulsion system 10 has added weight and volume due to the requirement for multiple, separate power generation components. As a propulsion system such as propulsion system 10 is typically used in aviation applications, it would be advantageous to reduce both weight and volume without reducing power or engine efficiency.

Figure 3:
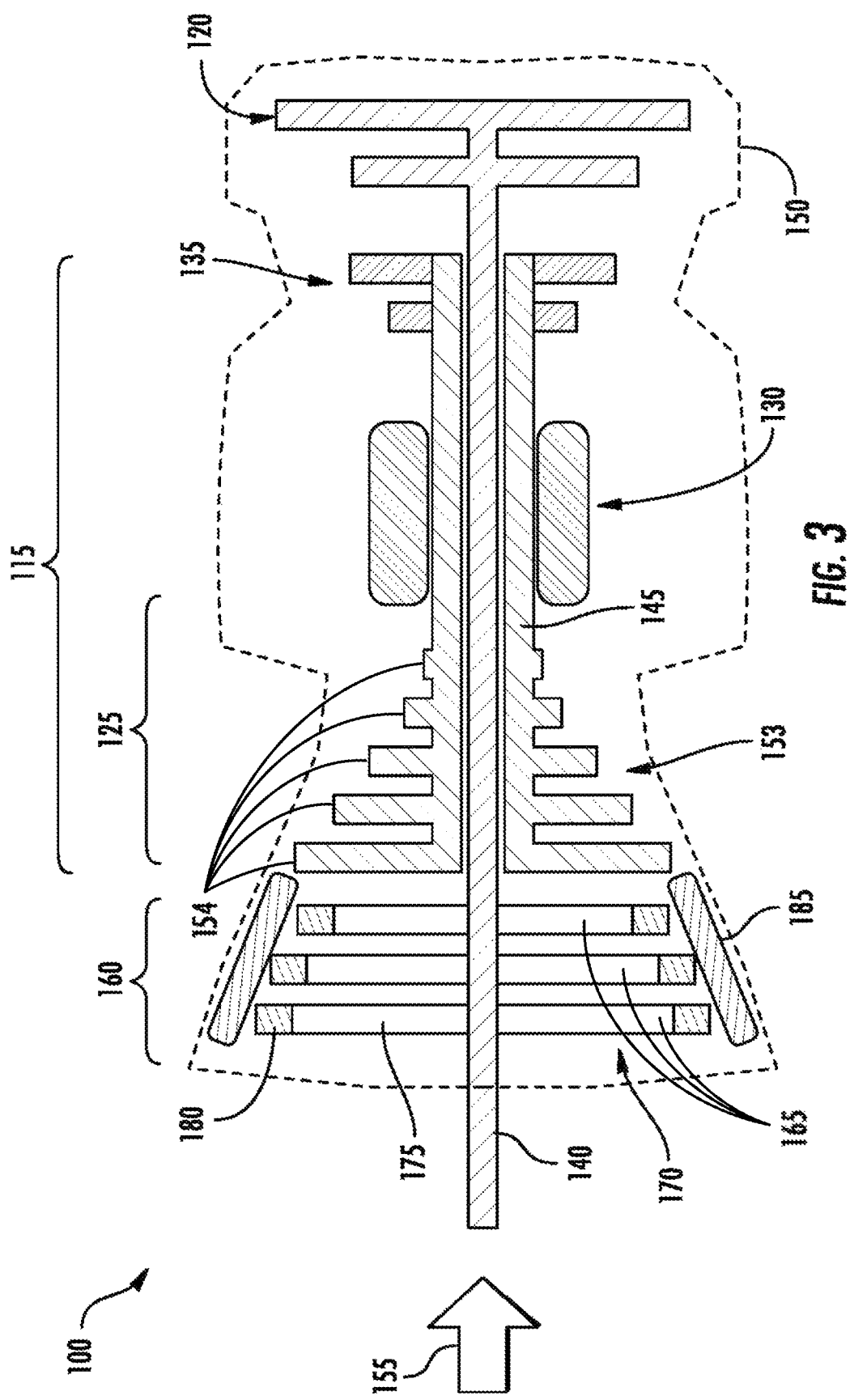
FIG. 3 is a schematic representation of a side cross-sectional view of an integrated hybrid propulsion system, according to an exemplary embodiment.

FIG. 3 shows a schematic representation of a side cross-sectional view of an integrated hybrid propulsion system 100, according to an exemplary embodiment. Integrated hybrid propulsion system 100 enables reduction of both weight and volume in comparison to typical propulsion systems (e.g., propulsion system 10) by implementing integrated electrical and gas power generation components. As shown in FIG. 3, the propulsion system 100 includes a gas generator section 115 and a power turbine 120. In various embodiments, the power turbine 120 may be disposed at a downstream end of the gas generator section 115. As illustrated, the gas generator section 115 includes a compressor section 125, a combustion section 130, and a high-pressure turbine 135. In various embodiments, the compressor section 125 may have a compression ratio ranging from about 4:1 to about 25:1. The aforementioned sections 115, 125, 130 and 135 may also be referred to as a gas generator stage, a compressor stage, a combustion stage and a turbine stage, respectively. An output power shaft 140, which is driven by the power turbine 120, extends through a central axis of the gas generator section 115. The output power shaft 140 is further disposed concentrically within a high-pressure turbine shaft 145 that couples the compressor section 125 and the high-pressure turbine 135. The output power shaft 140 and the high-pressure turbine shaft 145 pass through the combustion section 130, which is disposed between the compressor section 125 and the high-pressure turbine 135. The gas generator section 115 and its components, along with the power turbine 120, is contained within an engine enclosure 150.

The compressor section 125 includes a multi-stage compressor 153 (e.g., N-stage compressor), which is configured to compress air flowing into the propulsion system 100 in an airflow direction 155. The multi-stage compressor 153 may include high-pressure axial and/or centrifugal stages 154. Air compressed within the compressor 153 flows through the combustion section 130 wherein the air is mixed with fuel (e.g., injected atomized fuel, gaseous fuel, natural gas, etc.) and ignited. The ignited mixture then flows into and through the high-pressure turbine 135 and the power turbine 120 to cause rotation thereof. The high-pressure turbine 135 is a multi-stage (e.g., N-stage) axial-flow type turbine.

Rotation of the high-pressure turbine 135 and the power turbine 120 generate shaft power to drive the high-pressure turbine shaft 145 and the output power shaft 140. The power turbine 120, which is also a multi-stage axial flow type turbine, is mechanically separated from the compressor section 125 in that the power turbine 120 extracts energy (i.e., work) from cycling within the gas generator section 115 (i.e., from the combusted air/fuel mixture) but does not otherwise affect operation or performance of the components within the gas generator section 115, including the compressor section 125.

The compressor section 125 is driven by the high-pressure turbine shaft 145. As previously described, the power turbine 120 drives the output power shaft 140, which is concentrically disposed within the high-pressure turbine shaft 145 and extracts energy (i.e., work) therein.

As illustrated in FIG. 3, integrated hybrid propulsion system 100 further includes an electrical power generator section 160 disposed upstream of the gas generator section 115. The electrical power generator section 160 may be a hybrid low-pressure compressor ("boost") section having a plurality of low-pressure compressor ("boost") stages 165 therein. The low-pressure compressor stages 165 are configured to facilitate generation of electrical power. The low-pressure compressor or boost stages 165 are axial-flow compressor stages (e.g., similar to the compressor stages 154 of multi-stage compressor 153). The boost stages 165 are driven by the output power shaft 140, which is mated to and driven by the power turbine 120. In various embodiments, the enclosure 150 is configured to circumferentially surround the electrical power generator section 160 in addition to the gas generator section 115.

Each of the axial-flow boost stages 165 includes a plurality of blades 170. Each of the blades 170 may include a non-magnetic portion 175 and a magnetic portion 180. In various embodiments, only a subset of the plurality of blades 170 includes a magnetic portion 180. As shown in FIG. 3, the magnetic portion 180 may be disposed at a distal or tip end of each of the blades 170. In various embodiments, the magnetic portion 180 may be disposed within a middle or proximal portion of the blades 170 with respect to the output power shaft 140. In other embodiments, the magnetic portion 180 may be distributed along a length and/or across a surface of the blades 170.

Conducting elements 185, such as conductor coils, may be mounted within the enclosure 150. In various embodiments, the conducting elements 185 may be integrally formed within the enclosure 150. In various embodiments, the conducting elements 185 may be removably coupled to an interior surface of the enclosure 150. Accordingly, during operation of the integrated hybrid propulsion system 100, the axial-flow boost stages 165 are driven by the output power shaft 140 such that the boost stages 165 may rotate about an axis defined by the output power shaft 140. During rotation of the boost stages 165, the magnetic portions 180 of at least a subset of the plurality of blades 170 form a rotating magnetic field, which may induce a current within the conducting elements 185. The induced current may then be extracted by one or more power output cables operably coupled to the conducting elements.

In various embodiments, the propulsion system 100 may include a Generator Integrated Control Unit (GICU), which may be integrated with an Engine Control Unit (ECU) and operably coupled to the power generator section 160, compressor section 125, power turbine 120, and/or the output power shaft 140. Accordingly, the GICU and/or ECU may be configured to control a rate of power generation within the power generator section 160 and/or adjust a speed of the power turbine 120 to correspondingly adjust a speed of the output power shaft 140 and/or the boost stages 165. In various embodiments, the GICU may be configured to adjust the speed of the power turbine 120 based on a threshold power output of the power generator section 160. Accordingly, the GICU may increase the speed of the power turbine 120 to increase the speed of the output shaft 140 and the boost stage 165 to cause an increase in power generation by the power generator section 160 to meet the threshold. Conversely, the GICU may decrease the speed of the power turbine 120 to cause a decrease in power generation by the power generator section 160 to meet the threshold. In various embodiments, the GICU may be configured to increase the power generated by the power generator section 160 to meet or anticipate a power demand. In various embodiments, the GICU and/or ECU may be controllers (e.g., microcontrollers each having microprocessors).

In various embodiments, the GICU and the ECU may collaboratively control the rate of power generation within the power generator section 160. For example, in an embodiment where the propulsion system 100 is controlled based on a speed of the power turbine 120 (e.g., by either the GICU and/or the ECU), the ECU may increase a fuel flow with increasing electrical load to cause a corresponding increase in speed of the gas generator 115. This speed increase provides increased flow and temperature energy to the power turbine 120, which enables maintaining a constant, predetermined speed of the power turbine 120 to produce increased electrical power. The predetermined speed may be based on one or more design or use application requirements of the propulsion system 100. In various embodiments, the produced electrical power could be used to drive one or more electric motors (e.g., to drive one or more pumps, actuators, etc.), an environmental control system, and/or a primary drive system for an aircraft (e.g., main rotor, tail rotor, etc.).

The GICU and/or ECU may each be implemented as a non-transitory computer readable medium, having computer-readable instructions stored thereon that, when executed, cause the processor to carry out the operations called for by the instructions.

In various embodiments, operation of the power turbine 120, and thus a rotation speed (e.g., rpm) of the output shaft 140, may be regulated to electrical power demand on an output from the power output cables. In various embodiments, in a boosted configuration, (e.g., including power generator section 160) there may be a reduction in a surge margin of the compressor section 125 as compared to a typical system (e.g., propulsion system 10), whereas the surge margin of the boost section (e.g., power generator section 160) may be unaffected. In other embodiments, power generation by the power generator section 160 may not affect a surge margin associated with one or more sections, such as the surge margin of the high-pressure compressor section 125. In various embodiments wherein electrical power is extracted from the compressor section 125, a compressor operating line may be artificially increased in response to electrical power demand, which would decrease the surge margin. Accordingly, since the propulsion system 100 is configured to also generate electrical power from the boost section (e.g., power generator section 160), the surge margin of the compressor section may be less impacted (i.e., by electrical power generation).

In various embodiments, the enclosure 150 may comprise one or more non-magnetic materials, which may include, but is not limited to, non-metallic and/or composite materials. In various embodiments, the magnetic portions 180 may include a magnetic alloy and/or a permanent magnet (e.g., samarium cobalt, neodymium iron boron, alnico, ferrite, etc.) mounted to or integrally formed within each corresponding blade 170. In some embodiments, the blades 170 may not include a non-magnetic portion 175 and only have a magnetic portion 180. In these embodiments, the blades 170 may be constructed of one or more magnetic and/or metallic alloys (e.g., titanium alloys, AM 355 stainless steel, etc.). In various embodiments, the blades 170 may be dual alloy blades. In various embodiments, a first subset of the blades 170 may include a magnetic alloy and/or a permanent magnet mounted to or integrally formed therein, and a second subset of the blade 170 may include or be formed of non-magnetic materials. In various embodiments, each of the blades 170 may be magnetized and include a magnetic portion 180 (e.g., including or being formed of one or more magnetic materials, including or having mounted thereto a permanent magnet).

Figure 4:
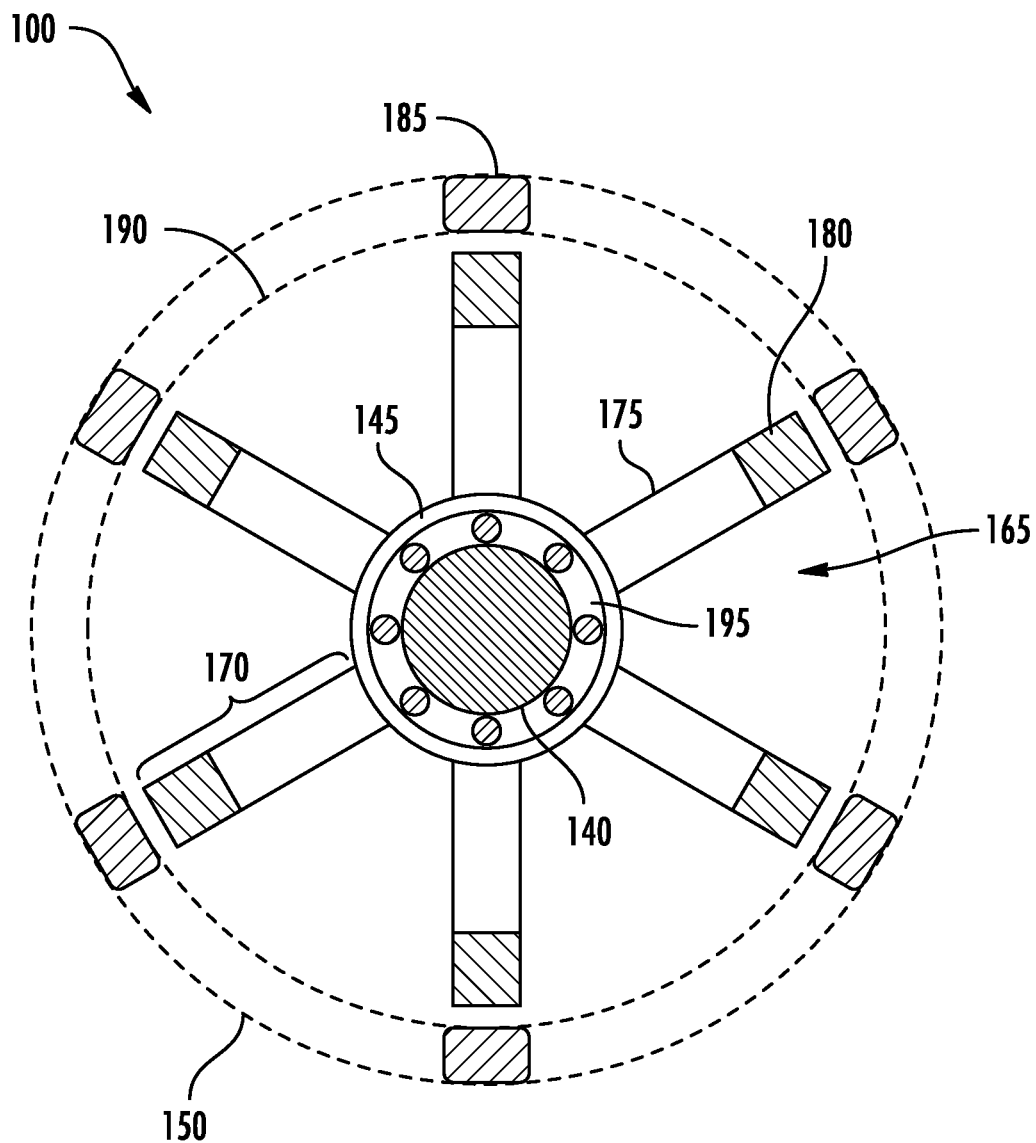
FIG. 4 is a schematic representation of an end cross-sectional view of the integrated hybrid propulsion system of FIG. 3.

FIG. 4 shows a schematic representation of an end cross-sectional view of the integrated hybrid propulsion system 100, according to an exemplary embodiment. As shown, blades 170 of each of the boost stages 165 may be driven by the output power shaft 140 to rotate thereabout. Accordingly, blades 170 having a magnetic portion 180 generate a rotating magnetic field, which may induce current within the conducting elements 185. Although FIG. 4 shows each of the blades 170 having a non-magnetic portion 175 and a corresponding magnetic portion 180, as described above, only a subset of the blades 170 or all of the blades 170 may include a magnetic portion 180 in accordance with various embodiments.

Although FIG. 4 shows a same number of conducting elements 185 as a number of blades 170, various embodiments of the integrated hybrid propulsion system 100 may include an unequal number of conducting elements and/or blades 170. Furthermore, although FIG. 4 shows boost stages 165 as having six blades 170, various embodiments of the propulsion system 100 may include any number of blades 170. Accordingly, various embodiments of the propulsion system 100 may include any number of conducting elements 185.

As illustrated in FIG. 4, the integrated hybrid propulsion system 100 further includes a shroud 190. The shroud 190 may be disposed between the electrical power generator section 160 and the enclosure 150. The shroud 190 is configured to reduce a clearance between tips of the blades of the boost stages 165 as excess tip clearance may cause poor compressive performance (e.g., within the power generator section 160 and/or the compressor section 125). In various embodiments, the shroud may be disposed between the conducting elements 185 and the blades 170 of the boost stages 165. In various embodiments, the shroud 190 may include or be formed of one or more non-magnetic materials including, but not limited to, non-metallic and/or composite materials or non-magnetic metallic materials (e.g., graphite epoxy composite or a nickel chromium material such as Iconel® alloy 718 made by Special Metals Corporation (Precision Castparts Corp., Portland, Oreg.), etc.). The propulsion system 100 may also include one or more bearings 195, which may be concentrically disposed adjacent the output power shaft 140 and/or the high-pressure turbine shaft 145 to facilitate ease of rotation. In various embodiments, the one or more bearings 195 may be configured to preserve shaft (e.g., shafts 140 and/or 145) alignment while allowing rotation of other system 100 components (e.g., rotors). In various embodiments, the one or more bearings 195 may include pressure lubricated roller and/or ball bearings, sleeve bearings, air bearings, magnetic bearings, or a combination thereof.

Figure 5:
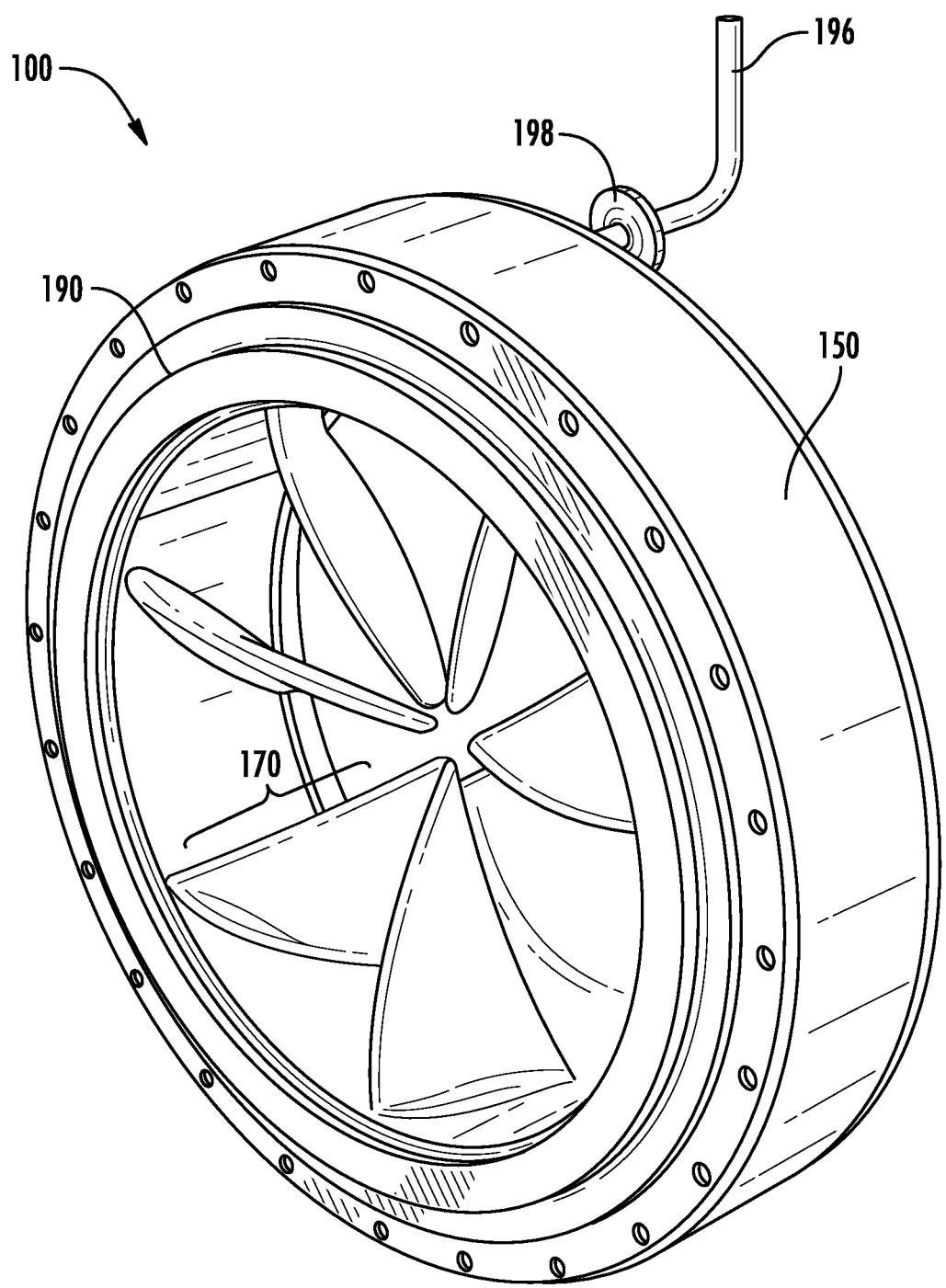
FIG. 5 is a perspective view of an integrated hybrid propulsion system, according to an exemplary embodiment.

FIG. 5 shows a perspective view of integrated hybrid propulsion system 100 near power output cables 196, according to an exemplary embodiment. As shown, the propulsion system 100 includes a plurality of blades 170 contained within an enclosure 150. A shroud 190 may be disposed between the blades 170 and the enclosure 150. As described, at least a subset of the plurality of blades 170 may include a magnetic portion such that when the blades 170 rotate within the enclosure, a rotating magnetic field is generated that subsequently induces a current within conducting elements 185, which are disposed between the shroud 190 and the enclosure 150. Induced current within the conducting elements 185 may be output from the propulsion system 100 via output cables 196, which may be coupled to the conducting elements 185 via a connection 198.

Figure 6:
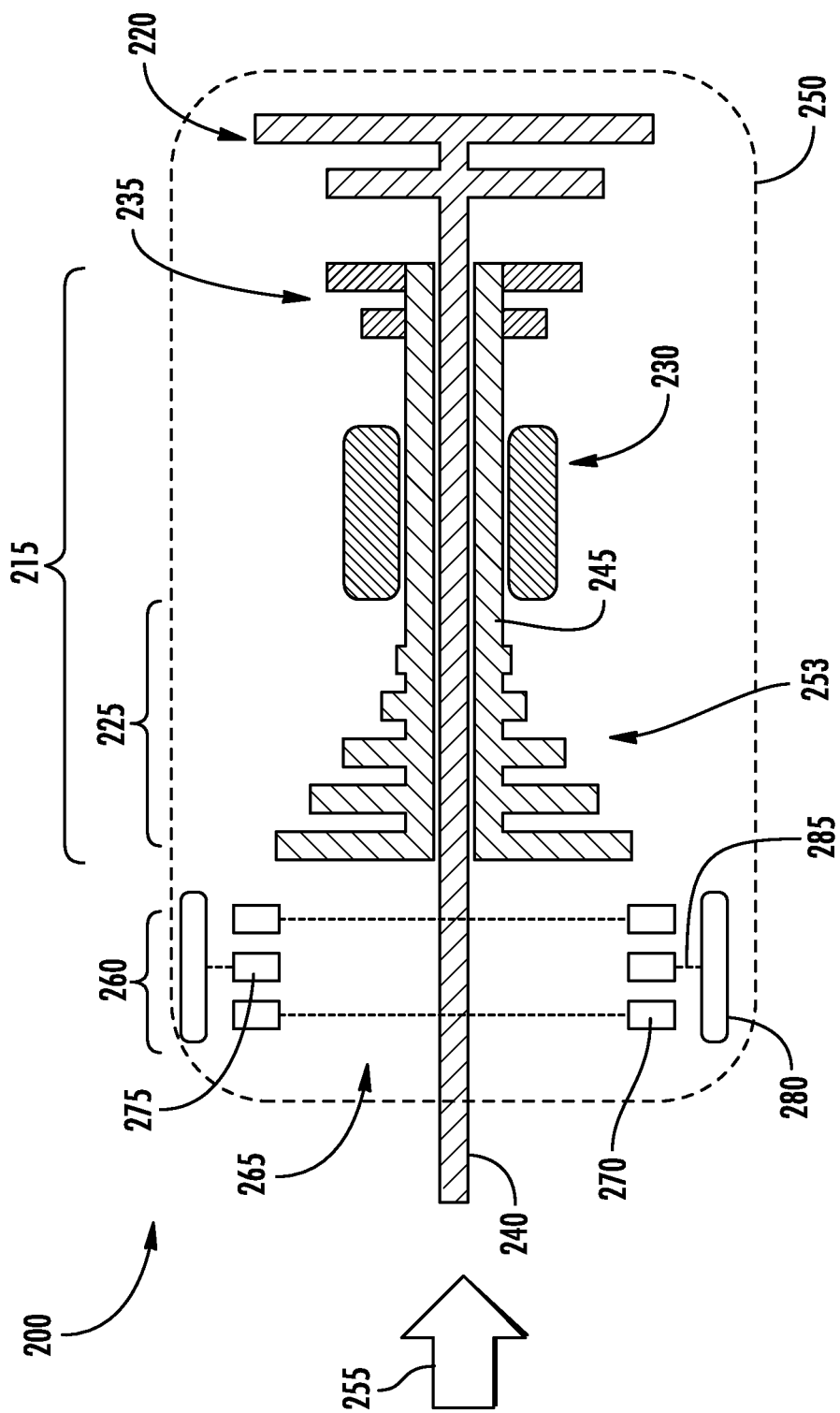
FIG. 6 is a schematic representation of a side cross-sectional view of an integrated hybrid propulsion system driving an axial flux rotor, according to another exemplary embodiment.
Figure 7:
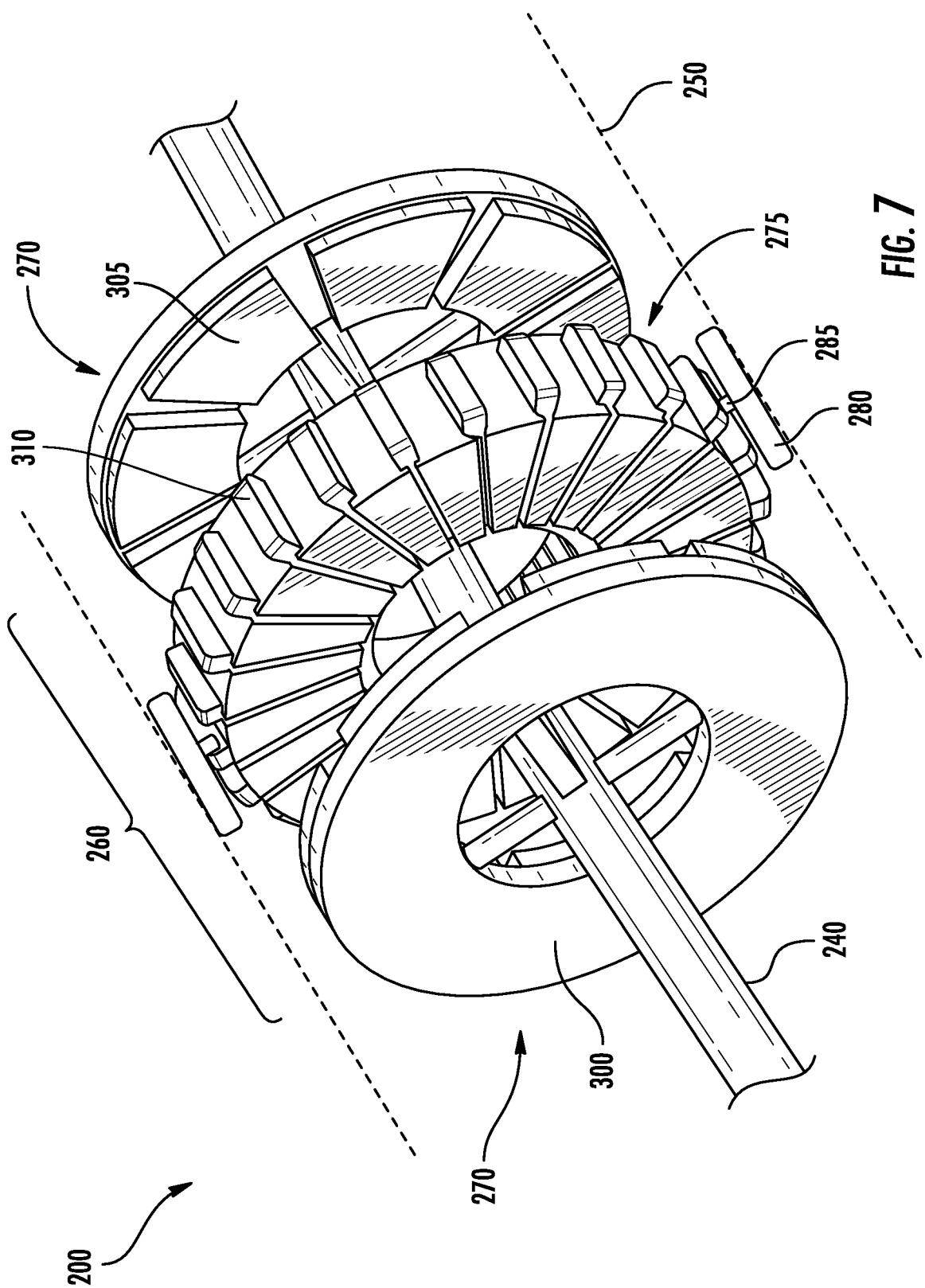
FIG. 7 is a schematic representation of a perspective view of the integrated hybrid propulsion system of FIG. 6 as may be provided with an axial flux electrical power generator.

FIGS. 6 and 7 show a schematic representation of side cross-sectional and perspective views of an integrated hybrid propulsion system 200, according to an exemplary embodiment. In various embodiments, elements 215 through 255 are of the propulsion system 200 are the same or equivalent to corresponding operations of the propulsion system 100. Accordingly, as illustrated in FIG. 6, integrated hybrid propulsion system 200 further includes an electrical power generator section 260 disposed upstream of the gas generator section 215. The electrical power generator section 260 may include a plurality of axial flux components 265, wherein the axial flux components 265 are configured to facilitate generation of electrical power.

The axial flux components 265 include at least one axial flux rotor 270 and at least one axial flux stator 275, wherein the at least one axial flux rotor 270 is driven by the output power shaft 240, which is mated to and driven by the power turbine 220. The at least one axial flux rotor 270 is configured to induce a magnetic field, and thus a current, within the axial flux stator 275 and coupled electrical components (e.g., coils). Accordingly, rotation of the at least one axial flux rotor 270 relative to the at least one axial stator 275, which remains stationary within the electrical power generator section 260, results in electrical power generation that may be transferred by an electrical connection 285 to one or more power output cables 280, which may be mounted to and/or embedded within the enclosure 250. In some embodiments, a portion of enclosure 250 disposed around at least one axial flux rotor 270 and at least one axial flux stator 275 is made of composite material. For example, only composite material may be provided where the at least one axial flux rotor 270 or the at least one axial flux stator 275 is provided, and other portions of enclosure 250 may be non-composite material. In various embodiments, the at least one axial flux stator 275 may be coupled to the enclosure 250.

As illustrated in FIG. 7, each of the at least one axial flux rotors 270 includes a non-magnetic portion 300 and a magnetic portion 305. As shown in FIG. 7, the non-magnetic portion 300 and magnetic portion 305 may be disposed on opposite sides of each axial flux rotor 270. In various embodiments, the magnetic portion 305 may be disposed at a distal end or edge of each of the axial flux rotors 270. In various embodiments, the magnetic portion 305 may be disposed within a middle or proximal portion of the axial flux rotors 270 with respect to the output power shaft 240. In yet other embodiments, the magnetic portion 305 may be distributed along a length and/or across a surface of axial flux rotors 270. In various embodiments, the magnetic portion may include a plurality of permanent magnets, which may be circumferentially arranged on a surface of at least one axial flux rotor 270. As illustrated, the at least one axial flux stator 275 may include a plurality of conducting elements 310, such as conductor coils, which may be mounted to, wound about, embedded, and/or integrally formed within the at least one axial flux stator 277. As shown, the at least one axial flux stator 275 may be coupled to one or more output cables 280 via at least one electrical connection 285. In various embodiments, the one or more output cables may be mounted to the enclosure 250 (e.g., disposed within an inner surface thereof).

Accordingly, during operation of the integrated hybrid propulsion system 200, the axial flux rotors 270 are driven by the output power shaft 240 such that the axial flux rotors 270 may rotate about an axis defined by the output power shaft 240 relative to the at least one axial flux stator 275 (which remains stationary). During rotation of the axial flux rotors 270, the magnetic portions 305 of the axial flux rotors 270 form a rotating magnetic field, which may induce a current within the conducting elements 310 of the at least one axial flux stator 275. The induced current may then be accessed and extracted by one or more power output cables 280 via at least one electrical connection 285. In various embodiments, the propulsion system 200 may further include a coupled variable load (e.g., battery, power storage device) to facilitate voltage and current management therein. In various embodiments, the variable load may be configured to fulfill a minimum load requirement. In various embodiments, the variable load may be caused by one or more electric motors (e.g., to drive one or more pumps, actuators, etc.), an environmental control system, and/or a primary drive system for an aircraft (e.g., main rotor, tail rotor, etc.).

In various embodiments, the propulsion system 200 may include a GICU, which may be integrated with an ECU, wherein the GICU and/or ECU of the propulsion system 200 may carry out all or some operations within the propulsion system 200 in a manner equivalent to corresponding operations within the propulsion system 100.

In various embodiments, one or more surge protectors (e.g., an overload surge protector) may be provided. Further, a surge margin may be provided for protection during power extraction. In various embodiments, power generation by power generator section 260 results in a reduction in surge margin of the propulsion system 200 as compared to a typical system (e.g., propulsion system 10). In other embodiments, power generation by the power generator section 260 may not affect the surge margin, such as the surge margin of the high-pressure compressor section 225. In various embodiments, a speed of rotation of the axial flux rotors 270 is regulated based on an output power of the electrical power generator section 260. In various embodiments wherein electrical power is extracted from the compressor section 225, a compressor operating line may be artificially increased in response to electrical power demand, which would decrease the surge margin. Accordingly, since the propulsion system 200 is configured to also generate electrical power from the boost section (e.g., power generator section 260), the surge margin of the compressor section may be less impacted (i.e., by electrical power generation).

In any of the implementations and/or embodiments of integrated hybrid propulsion system 100 and 200, integration of an electrical power generator (e.g., electrical power generator section 160 or 260) with a gas generator (e.g., gas generator section 115 or 215) reduces weight and volume compared to typical propulsion systems (e.g., propulsion system 10), which requires separate components. Furthermore, integrating the electrical power generator (e.g., 160 or 260) at an upstream position relative to the electrical power generator (e.g., 115 or 215) results in a cooler air temperature (e.g., in an airflow direction 155 or 255) within the electrical power generator (e.g., 160 or 260), which reduces resistance and improves current induction from rotation of magnetic and non-magnetic components, and thus increases electrical power generation, therein. Accordingly, in any of the implementations and/or embodiments of integrated hybrid propulsion system 100 and 200, the enclosure (e.g., 150 or 250) may be contoured to facilitate improved airflow within the electrical power generator section (e.g., 160 or 260) to cool conducting elements (e.g., 185, 310). In various embodiments, the enclosure (e.g., 150 or 250) may be configured to have a contour corresponding to a geometry of the electrical power generator section (e.g., 160 or 260). Additionally or alternatively, the enclosure (e.g., 150 or 250) may include one or more inlets and/or outlets to facilitate active and/or passive ventilation and cooling of the conducting elements (e.g., 185, 310).

Notwithstanding the embodiments described above in reference to FIGS. 1-7, various modifications and inclusions to those embodiments are contemplated and considered within the scope of the present disclosure.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter disclosed.

Accordingly, all such modifications are intended to be included within the scope of the present disclosure. Other substitutions, modifications, changes, and omissions may be made in the design, operating conditions, and arrangement of the preferred and other illustrative embodiments without departing from scope of the present disclosure or from the scope of the appended claims.

The herein described subject matter sometimes illustrates different components contained within, or connected with, different other components. It is to be understood that such depicted architectures are merely exemplary, and that in fact many other architectures can be implemented which achieve the same functionality.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. It will be understood by those within the art that, in general, terms used herein, and especially in appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Similarly, unless otherwise specified, the phrase "based on" should not be construed in a limiting manner and thus should be understood as "based at least in part on." Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

What is claimed is:

1. A hybrid propulsion system comprising:
    a gas generator section comprising a high-pressure compressor;
    an electrical power generator section disposed upstream of the gas generator section and configured to be driven by a power turbine;
    an output power shaft mated to the power turbine and extending through a central axis of the gas generator section and the power generator section;
    an engine enclosure, wherein the engine enclosure is configured to circumferentially surround the power generator section; and
    a shroud disposed between the power generator section and the engine enclosure, wherein the shroud comprises non-magnetic material;
    wherein the power generator section comprises:
        a low pressure compressor comprising at least three axial-flow compressor stage rotating members arranged along the output power shaft, and wherein each of the at least three axial-flow compressor stage rotating members includes a magnetic portion; and
        a conducting element mounted within the engine enclosure;
    wherein rotation of the at least three axial-flow compressor stage rotating members relative to the conducting element generates a current transmissible by one or more coupled power output cables;
    wherein the output power shaft is disposed concentrically within a turbine shaft located in the gas generator section, the output power shaft being structured to extend entirely through the gas generator section and the power generator section;
    wherein the shroud is configured to reduce a clearance between the at least three rotating members and the engine enclosure, and wherein the shroud is disposed between the conducting element and the at least three axial-flow compressor stage rotating members.

2. The system of claim 1, wherein each of the at least three axial-flow compressor stages is driven by the output power shaft, which is coupled to the power turbine located downstream of the gas generator section.

3. The system of claim 1, wherein:
    each of the at least three axial-flow compressor stages comprises a plurality of blades;
    the magnetic portion is formed by at least a subset of the plurality of blades; and
    each of the subset of the plurality of blades is made of one or more magnetic alloys.

4. The system of claim 1, wherein:
each of the at least three axial-flow compressor stages comprise a plurality of blades;
the magnetic portion is formed by at least a subset of the plurality of blades; and
each of the subset of the plurality of blades includes a permanent magnet embedded within a tip portion of each blade such that only the subset of the plurality of blades is magnetized.

5. The system of claim 1, wherein the conducting element is integrally formed within the engine enclosure.

6. The system of claim 1, wherein the shroud comprises non-magnetic metallic or non-magnetic composite material.

7. The system of claim 1, wherein the conducting element includes one or more conductive coils.

8. A hybrid propulsion system comprising:
a gas generator section comprising a high-pressure compressor;
an electrical power generator section disposed upstream of the gas generator section and configured to be driven by a power turbine;
an output power shaft mated to the power turbine and extending through a central axis of the gas generator section and the electrical power generator section;
an engine enclosure, wherein the engine enclosure is configured to circumferentially surround at least the power generator section, and includes a conductive portion comprising a plurality of coils; and
a shroud disposed between the power generator section and the engine enclosure, wherein the shroud comprises non-magnetic material;
wherein the power generator section comprises:
a low pressure compressor comprising at least three axial-flow compressor stages arranged along the output shaft and configured to rotate about an axis defined by the output power shaft, wherein each of the at least three axial-flow compressor stages includes a plurality of blades, a magnetic portion, and a non-magnetic portion; and
wherein rotation of the at least three axial-flow compressor stages relative to the engine enclosure generates a current transmissible by one or more power output cables coupled to the engine enclosure; and
wherein the output power shaft is disposed concentrically within a turbine shaft located in the gas generator section, the output power shaft being structured to extend entirely through the gas generator section and the power generator section; and
wherein the shroud is configured to reduce a clearance between the at least three axial-flow compressor stages and the engine enclosure, and wherein the shroud is disposed between the conductive portion and the axial-flow compressor stages.

9. The system of claim 8, wherein the magnetic portion is formed by at least a subset of the plurality of blades, and wherein each of the subset of the plurality of blades is made of one or more magnetic alloys.

10. The system of claim 8, wherein the magnetic portion is formed by at least a subset of the plurality of blades, and wherein each of the subset of the plurality of blades includes a permanent magnet embedded within a tip portion of each blade.

11. The system of claim 8, wherein the conductive portion is mounted to an inner surface of the engine enclosure.

12. The system of claim 8, wherein the engine enclosure comprises a non-magnetic section, wherein the non-magnetic section surrounds the power generator section.

13. The system of claim 12, wherein the non-magnetic section of the engine enclosure comprises at least one of a graphite epoxy composite or a nickel chromium alloy.

14. A hybrid propulsion system comprising:
a gas generator section comprising a high-pressure compressor;
an electrical power generator section disposed upstream of the gas generator section and configured to be driven by a power turbine;
an output power shaft mated to the power turbine and extending through a central axis of the gas generator section and the power generator section; and
an engine enclosure, wherein the engine enclosure is configured to circumferentially surround the power generator section;
wherein the power generator section comprises:
one or more disc-shaped flux rotors mated to the output power shaft and configured to rotate with the output power shaft about an axis defined by the output power shaft; and
at least one disc-shaped flux stator disposed adjacent at least one of the one or more disc-shaped flux rotors
wherein each of the disc-shaped flux rotors includes a magnetic portion and a non-magnetic portion;
wherein the magnetic portion of each of the disc-shaped flux rotors generates a current within a stationary conductor portion when each of the disc-shaped flux rotors rotates about the axis relative to the engine enclosure;
wherein a speed of rotation of the one or more disc-shaped flux rotors is regulated by a load requirement;
wherein the output power shaft is disposed concentrically within a turbine shaft located in the gas generator section, the output power shaft being structured to extend entirely through the gas generator section and the power generator section; and
wherein the stationary conductor portion comprises the least one disc-shaped flux stator disposed adjacent at least one of the one or more disc-shaped flux rotors, and wherein the at least one disc-shaped flux stator is coaxial with the one or more disc-shaped flux rotors.

15. The system of claim 14, wherein the at least one disc-shaped flux stator is coupled to the engine enclosure.

16. The system of claim 14, wherein the engine enclosure transmits the current generated within the stationary conductor portion via one or more coupled output cables.

17. The system of claim 14, further comprising a variable load coupled to the power generator section, wherein the variable load is configured to fulfill a minimum load requirement.

18. The system of claim 14, wherein the magnetic portion comprises a plurality of circumferentially arranged permanent magnets.

* * * * *